(12) United States Patent
Phan-Anh

(10) Patent No.: US 7,181,211 B1
(45) Date of Patent: Feb. 20, 2007

(54) SERVICE DISCOVERY AND SERVICE PARTITIONING FOR A SUBSCRIBER TERMINAL BETWEEN DIFFERENT NETWORKS

(75) Inventor: Son Phan-Anh, Budapest (HU)

(73) Assignee: Nokia Corporation, Espoo (FI)

( * ) Notice: Subject to any disclaimer, the term of this patent is extended or adjusted under 35 U.S.C. 154(b) by 16 days.

(21) Appl. No.: 10/398,414

(22) PCT Filed: Oct. 10, 2000

(86) PCT No.: PCT/EP00/09964

§ 371 (c)(1),
(2), (4) Date: Aug. 4, 2003

(87) PCT Pub. No.: WO02/32178

PCT Pub. Date: Apr. 18, 2002

(51) Int. Cl.
*H04Q 7/20* (2006.01)

(52) U.S. Cl. .............. 455/432.1; 455/435.1; 455/433; 455/425; 455/403; 370/252; 709/203

(58) Field of Classification Search .......... 455/432.1, 455/432.3, 433, 435.1–435, 435.2, 403, 422.1, 455/425, 461, 432, 452.1, 436, 517, 550.1, 455/552.1; 370/252, 254, 329, 331, 338; 709/203, 246; 713/150
See application file for complete search history.

(56) References Cited

U.S. PATENT DOCUMENTS 5,371,782 A * 12/1994 Casey et al. ............... 455/465
(Continued)

FOREIGN PATENT DOCUMENTS

DE        199 41 337        3/2001
(Continued)

OTHER PUBLICATIONS

R. Droms, "Dynamic Host Configuration Protocol", IETF RFC 2131, Mar. 1997, 42 pgs.
(Continued)

*Primary Examiner*—Jean Gelin
*Assistant Examiner*—Kamran Fashar
(74) *Attorney, Agent, or Firm*—Squire, Sanders and Dempsey, LLP.

(57) ABSTRACT

The present invention is a method for service provisioning to a subscriber terminal (TE) having roamed from a first communication network (H-NW) to a second communication network (V-NW), each of said first and second networks comprises an access network (H-A-NW, V-A-NW; TL-NW) via which said subscriber terminal (TE) communicates with an associated core network (H-C-NW, V-C-NW), each of said core networks (H-C-NW, V-C-NW) being provided with at least one communication control entity (H-S-CSCF, V-S-CSCF) for performing, according to available services, communication control between the respective communication network and the terminal, and a database entity (H-SLS, V-SLS) keeping a record of available communication control entities in said core network of said communication network, said method comprising the steps of: accessing (S1), from said subscriber terminal (TE), the core network (V-C-NW) of said second communication network (V-NW), discovering (S2–S10) at least one communication control entity among the communication control entities of both core networks, which is capable of controlling the communication with the subscriber terminal (TE) according to services requested by the subscriber terminal, and registering (S11–S14) to at least one of said at least one discovered communication control entity, irrespective of whether it is located in said first or said second communication network.

8 Claims, 3 Drawing Sheets

U.S. PATENT DOCUMENTS

| | | | | |
|---|---|---|---|---|
| 5,583,917 | A | * | 12/1996 | Jonsson ........................ 455/461 |
| 5,606,595 | A | * | 2/1997 | Ejzak ........................... 370/349 |
| 5,689,549 | A | * | 11/1997 | Bertocci et al. ............. 455/463 |
| 5,724,658 | A | * | 3/1998 | Hasan .......................... 455/445 |
| 5,758,285 | A | * | 5/1998 | Chavez et al. ............... 455/445 |
| 5,781,863 | A | * | 7/1998 | Bales et al. ............... 455/456.1 |
| 6,411,807 | B1 | * | 6/2002 | Amin et al. ............... 455/432.3 |
| 6,529,732 | B1 | * | 3/2003 | Vainiomaki ................. 455/433 |
| 6,571,095 | B1 | * | 5/2003 | Koodli ..................... 455/435.1 |
| 6,622,016 | B1 | * | 9/2003 | Sladek et al. ............ 455/414.1 |
| 6,633,761 | B1 | * | 10/2003 | Singhal et al. .............. 455/436 |
| 6,810,257 | B1 | * | 10/2004 | Amin .......................... 455/445 |
| 6,816,912 | B1 | * | 11/2004 | Borella et al. ........... 455/432.1 |
| 2002/0069278 | A1 | * | 6/2002 | Forslow ....................... 709/225 |
| 2002/0161883 | A1 | * | 10/2002 | Matheny et al. ............ 709/224 |
| 2003/0139187 | A1 | * | 7/2003 | Zhang et al. ................ 455/445 |
| 2004/0010590 | A1 | * | 1/2004 | Manzano ..................... 709/224 |
| 2004/0072555 | A1 | * | 4/2004 | Grech et al. ................. 455/403 |
| 2005/0276229 | A1 | * | 12/2005 | Torabi .......................... 370/252 |

FOREIGN PATENT DOCUMENTS

| | | |
|---|---|---|
| EP | 0 888 025 | 3/1998 |
| WO | 00/56111 | 9/2000 |

OTHER PUBLICATIONS

E. Guttman, C. Perkins, J. Veizades and M. Day, "Service Location Protocol, Version 2", IETF RFC 2608, Jun. 1999, 51 pgs.

C. perkins and E. Guttman, "DHCP Options for Service Location Protocol", IETF RFC 2610, Jun. 1999—6 pgs.

R. Koodli et al., "CSCF Discovery in 3GP.IP Networks", 3G.IP meeting, Toronto, Canada, pp. 1-5, Aug. 17, 1999.

R. Droms, "Dynamic Host Configuration Protocol", IETF RFC 2131, pp. 1-42, Mar. 1997.

E. Guttman et al., "Service Location Protocol, Version 2", IETF RFC 2608, pp. 1-51, Jun. 1999.

C Perkins et al., "DHCP Options for Service Location Protocol", IETF RFC 2610, pp. 1-6, Jun. 1999.

M. Fuller, "CSCF Discovery Contributions", BT-3G.IP meeting, Stockholm, Sweden, Nov. 16, 1999.

H. Tran et al., "Transparent CSCF Discovery procedures in 3GIP", 3G.IP meeting, Stockholm, Sweden, Sep. 14-17, 1999.

J. Yang, "An approach to discovery of CSCF and other servers", 3G.IP meeting, London, United Kingdom, Sep. 14, 1999.

* cited by examiner

SERVICE DISCOVERY AND SERVICE PARTITIONING FOR A SUBSCRIBER TERMINAL BETWEEN DIFFERENT NETWORKS

BACKGROUND OF THE INVENTION

1. Field of the Invention

The present invention concerns a method for service provisioning to a subscriber terminal having roamed from a first communication network to a second communication network.

2. Description of the Prior Art

In recent years, communication networks have widely spread and are increasingly used by a still increasing number of subscribers to such communication networks. Examples of such communication networks are a telecommunication network for mobile communication between subscribers, such as the GSM network, GPRS network or UMTS network ($3^{rd}$ generation mobile telecommunication network). Data transmitted via those networks may either be circuit switched data such as (real-time) speech data or packet switched data such as image data etc. Also, such telecommunication networks may for example be those networks which are operated using the Internet Protocol (IP). Nevertheless, the expression communication network is intended to cover also a communication network such as the Internet itself.

For communication between subscribers, a subscriber's (or user's) terminal equipment accesses the network and communicates via the network with the far-end terminal of the communication partner. Nevertheless, a communication may take place also between the terminal and the network, for example upon configuring the services for communication for a respective subscriber's terminal. As terminals to be operated in conjunction with the communication network, for example mobile terminals communicating via a radio interface with the network may be used. Mobile terminals may be a mobile stations MS in a GSM network, a user equipment UE in UMTS networks (or UMTS_MS, shortly UMS) etc. However, also non-mobile terminals (not communicating via a radio interface) may be used for communication with/via the network such as personal computers and or laptops which may be carried by the user to another place within the network and are then again connected to the network (in this sense, also e.g. laptops could be considered as being "mobile").

Subsequently, without the intention of any limitation of the present specification, but solely for the purpose of facilitating the description, reference is made to a communication network conforming to the standard of the $3^{rd}$ generation (3G, UMTS) and which enables telephony based on the Internet Protocol (IPT: IP Telephony) (also known as "voice over IP", "VoIP"). This example network is also referred to as 3G IPT network.

With the spreading of plural networks each operated by a different operator, it is desirable that a subscriber may be offered the services desired even if the subscriber presently communicates via a network the subscriber initially did not subscribe to. That is, normally, a subscriber subscribes to a network of a network operator and is registered to this network as the home network (also referred to as a first network in this specification). If the subscriber moves/ registers to another network (visited network) to which the subscriber did not initially subscribe to (also referred to as a second network in this specification), the subscriber nevertheless desires to have communication services available.

In 3G IPT communication networks, a functional entity known as call state control function (CSCF) is adapted to provide the services to a respective terminal equipment. This entity is herein below also referred to as communication control entity. Thus, upon registration/attachment to a network (home or visited network), it is necessary that the terminal equipment discovers a call state control functional entity within the network. A network may contain several communication control entities, a respective entity being adapted for the provision of specific services not offered by the others, or each communication control entity offers the same services but serves a different network area.

For such a discovery of a communication control entity, the terminal equipment first performs an attachment to an access network (for example, GPRS network, General Packet Radio Service) as a part of the communication network. In order to be provided with Internet Telephony service (IPT services) the terminal equipment has to perform a CSCF discovery procedure in order to get an address of the communication control entity (CSCF), that is in order to "learn", where the communication control entity is located in the network such that it can be contacted for service provisioning.

Recently proposed CSCF discovery methods, however, are not yet fully satisfactory. Namely, those CSCF discovery methods are either suitable for discovering the communication control entity of the home network or for discovering the communication control entity of the visited network. The subscriber can get services either from home NW or visited NW but not from both at the same time.

However, both of the above mentioned concepts have some limitations and difficulties. In particular, in a case when only the visited NW provides the services, it may offer different services as compared to the home network of the subscriber, then limitations as to the available services may be imposed on the subscriber. This means, that the subscriber may for example be impeded to use services offered by the subscriber home network, but which are not implemented in the visited network. In the opposite case, when only the Home NW provides services, there are difficulties with providing location-dependent services like for example the "Order the Pizza" one.

Consequently, the subscriber does not have the combined benefit of the services offered by both the home network and the visited network, since the existing scenarios do not support flexibility of service discovery (CSCF discovery) for a roaming subscriber.

SUMMARY OF THE INVENTION

Hence, it is an object of the present invention to provide an improved method for service provisioning to a subscriber terminal having roamed from a first communication network to a second communication network.

According to the present invention, this object is achieved by a method for service provisioning to a subscriber terminal having roamed from a first communication network to a second communication network, each of said first and second networks comprises an access network via which said subscriber terminal communicates with an associated core network, each of said core networks being provided with at least one communication control entity for performing, according to available services, communication control between the respective communication network and the terminal, and a database entity keeping a record of available communication control entities in the core network of the communication network, the method comprising the steps of: accessing, from the subscriber terminal, the core network of the second communication network, discovering at least one communication control entity among the communication control entities of both core networks, which is capable of controlling the communication with the subscriber terminal according to services requested by the subscriber terminal, and registering to at least one of said at least one discovered communication control entity, irrespective of whether it is located in said first or said second communication network.

In the present specification, however, the expression communication network is to be understood in its broadest sense and not limited to a particular network type or protocol used for transmission of whatever data.

In the present specification, however, the expression terminal equipment is also to be understood in its broadest sense and not limited to a particular terminal equipment type.

Thus, with the present invention it is advantageously enabled that one method for service provisioning is suitable for all three scenarios, that is that a communication control entity (CSCF) or entities located in the home network, or a communication control entity or entities in the visited network, or in both, home and visited network is/are discovered and registered to. By virtue of this, a splitting of provided services between communication control entities of the home network and the visited network is enabled, such that a roaming subscriber has the possibility to be served with services from the home network as well as from the visited network. Thus, by virtue of the present invention, all services by either network may be simply provided to a subscriber, that is to the subscriber's terminal equipment, or the services provisioned may be shared among the networks.

Beside the sharing services provisioning, the method can be used for load balancing between the networks or within a network.

Additionally, the method is access independent so that there is no impact on and/or requirement for changing of the access network of the network (for example, the GPRS access network may be used as it is).

Still further, the method does not exclude the option of provisioning the services to the subscriber from only one NW (either Home or Visited NW). In this case, only one communication control entity will be registered to for service provisioning. Thus, the number of signaling messages can be reduced significantly.

According to further developments of the present invention, the step of discovering further comprises the steps of accessing, from the subscriber terminal, the database entity of the core network of the second communication network, and accessing, from the database entity of the core network of the second communication network, the database entity of the core network of the first communication network;

accordingly, this offers the advantage that the discovery is performed as a two-level database discovery, that is the databases in both networks, home and visited network, are involved; thus, a respective database (service location server and/or service lookup server, SLS) is responsible for selecting a suitable communication control entity (CSCF) within its own network, which reduce the unnecessary coordination across network border. The database in the visited network is discovered by the roaming terminal equipment and the database in the home network is discovered/determined in the next level by the database of the visited network, or the address of home database can be assigned to the terminal equipment, which provides it to the visited database.

the step of discovering further comprises the steps of partitioning services requested by the subscriber terminal into service subsets, such that each service subset is adapted to services available in a respective one of the first and second communication networks;

accordingly, this offers the advantage that it increases the flexibility of the service provisioning among the networks, that is local service may be provisioned by the visited network, while (a part of or all) remaining services are continuously provided by the home network;

the partitioning is effected by the database entity of the core network of the first communication network;

accordingly, this offers the advantage that the decision of service provisioning can be decided by the network operator internally, according to the prevailing needs, also, the subscriber is widely relieved from selecting the services to be provisioned to the subscriber; also, the database entity of the home network may request the discovery of the communication control entity (CSCF) of the visited network by the database of the visited network on behalf of the subscriber (subscriber terminal) only if required;

the step of partitioning comprises a further step of evaluating a partitioning condition;

the partitioning condition to be evaluated consists of at least one of the following partitioning condition parameters (but not limited only to them): an application level subscriber identity (ALSI) or any kind of appropriate ID which can be used to determine the subscriber's subscription profile, a terminal capability defining the services to which the terminal equipment is adapted, a subscribers preference defining preferred services set beforehand by the subscriber, a first-communication-network-service-capability defining the services that may be provisioned by the first communication network, a second communication network service restriction defining services that may not be provisioned by the second communication network;

accordingly, the two immediately preceding further developments offer the advantage that a partitioning is optimized in consideration of the currently prevailing conditions in the network(s) and of the terminal equipment's capabilities;

the steps of accessing, discovering and registrating are performed using messages conforming to the service location protocol (SLP);

accordingly, this offers the advantage that all necessary signaling messages can be implemented using the same protocol without a real need for modification; also the service registration which takes place between the communication control entity (CSCF) and a respective database (SLS) can be conducted in a normal way by using the appropriate SLP message therefor; additionally, using SLP enables to discover the services as such and not only the communication control entities (CSCF's) as in case of using SIP (Session Initiation Protocol); still further, the usage of SLP extends the applicability of the presented method to other kinds of terminals such as laptop-like terminals which need SLP for LAN (local area network) connection.

BRIEF DESCRIPTION OF THE DRAWINGS

The present invention will be more readily understood upon referring to the attached drawings, in which.

DETAILED DESCRIPTION OF EMBODIMENTS

Subsequently, the present invention is described in detail with reference to the drawings.

Figure 1:
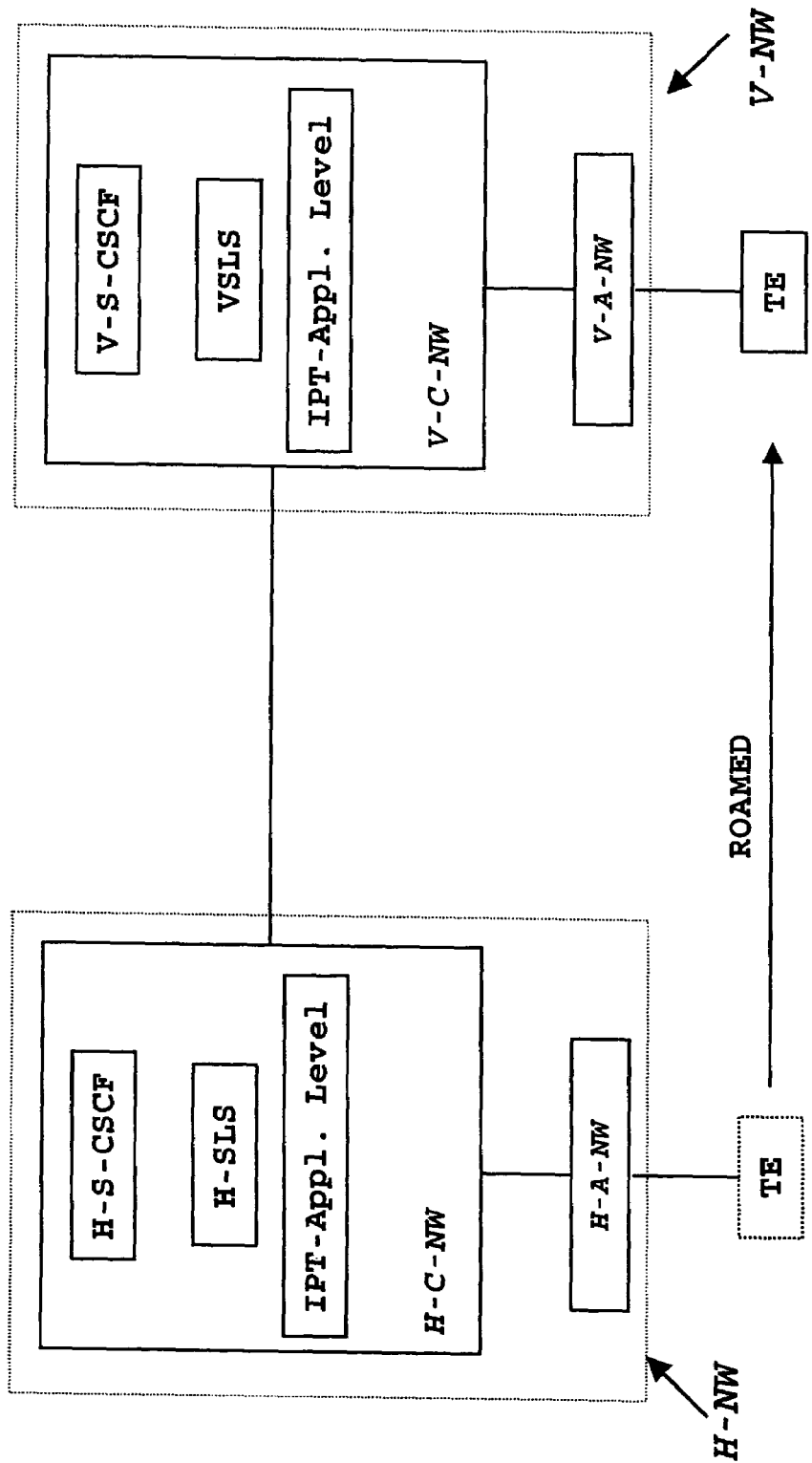
FIG. 1 illustrates a basic network architecture of a home and visited communication network with a subscriber having roamed.

FIG. 1 illustrates a basic network architecture of a home communication network and visited communication network with a subscriber having roamed. Note that in the figures and description thereof entities of the home network are denoted with a prefix "H", while those entities of the visited network are denoted with a prefix "V". Note also that the illustrated described example is given with reference to a so-called 3G IPT network, which however is not intended to be limiting in any way, but rather has been chosen as an example architecture for a network. Any other network offering similar functionalities and being provided with similar functional entities may be suitable for the present invention being implemented.

As shown in FIG. 1, a terminal equipment TE is initially registered to (or accesses and/or communicates with) its home network H-NW (first network). The terminal equipment of a subscriber may be a mobile station MS or third generation (UMTS) user equipment UE. The terminal equipment is provided with a user agent. A user agent (UA) is a functional entity working on the user's/subscriber's behalf to establish contact with some service. The user agent retrieves service information from service agents (SA) or directory agents (DA), both of which being explained later.

The home network H-NW comprises a (home) access network H-A-NW. For example, the access network may be a GPRS access network (GPRS=General Packet Radio Service). However, other access networks are also possible to be used. (The access network is also referred to (see FIG. 2) as transport level network (TL-NW).)

The terminal equipment TE uses the access network H-A-NW to communicate with (and via) the core network H-C-NW of the home network. The home core network in turn comprises a functional entity denoted with "IPT-Appl.-Level" which is adapted to take care of the Internet Protocol telephony application layer. Such functional entities are known as such and a description thereof is thus deemed to be dispensable.

Moreover, the core network is furnished with a database entity H-SLS also referred to as service location server and/or service lookup server. (The same functionality is sometimes also named "server discovery agent" (SDA).) The database entity H-SLS keeps a record of available communication control entities in the core network of the communication network. The record may be kept in the form of addresses (for example, IP addresses) of the communication control entities. Alternatively, some so-called hostname may usually be kept in the record instead of the IP address. Generally, however, any kind of ID can be used for this purpose>(Based on for example the addresses, the database entity H-SLS may retrieve a communication control entity such as a call state control functional entity CSCF and communicate the address thereof to a terminal requesting a service provisioned by said communication control entity. A database entity SLS acts as a directory agent. Such a directory agent (DA) is a functional entity which collects service advertisements/service offers advertised by a service agent (see below).

FIG. 1 shows a case, in which only one communication control entity, namely the serving communication control entity H-S-CSCF of the home network is illustrated for the purpose of keeping the illustration simple. Serving communication control entity means that this communication control entity is responsible for controlling the communication with and/or for a terminal registered and/or attached to the network. Of course, a core network may comprise plural communication control entities, for example depending on the network size and or number/type of services that may be provided. Thus, a communication control entity may be assigned to a specific area of the network and provisioning all services, or may be assigned to a specific type of service provisioned by the network or assigned to a combination of these possibilities.

A communication control entity CSCF is acting as a service agent. Such a service agent (SA) is a functional entity working on behalf of one or more services to advertise/offer the services.

Furthermore, as the home and visited network are rather similar in terms of architecture and functionalities, the border therebetween is of rather administrative nature. For explanatory purposes, however, the home and visited network have been drawn to be distinct from each other, with a communication path between the core networks of the home network and the visited network.

With regard to the network constitution of the visited network (second communication network), it is to be noted that it is similar to the one of the home network, with like functional entities being denoted by like reference signs which differ only in terms of the prefix "V" representing the visited network V-NW. Therefore, a repeated detailed description of the visited network V-NW is considered to be superfluous.

Figure 2A:
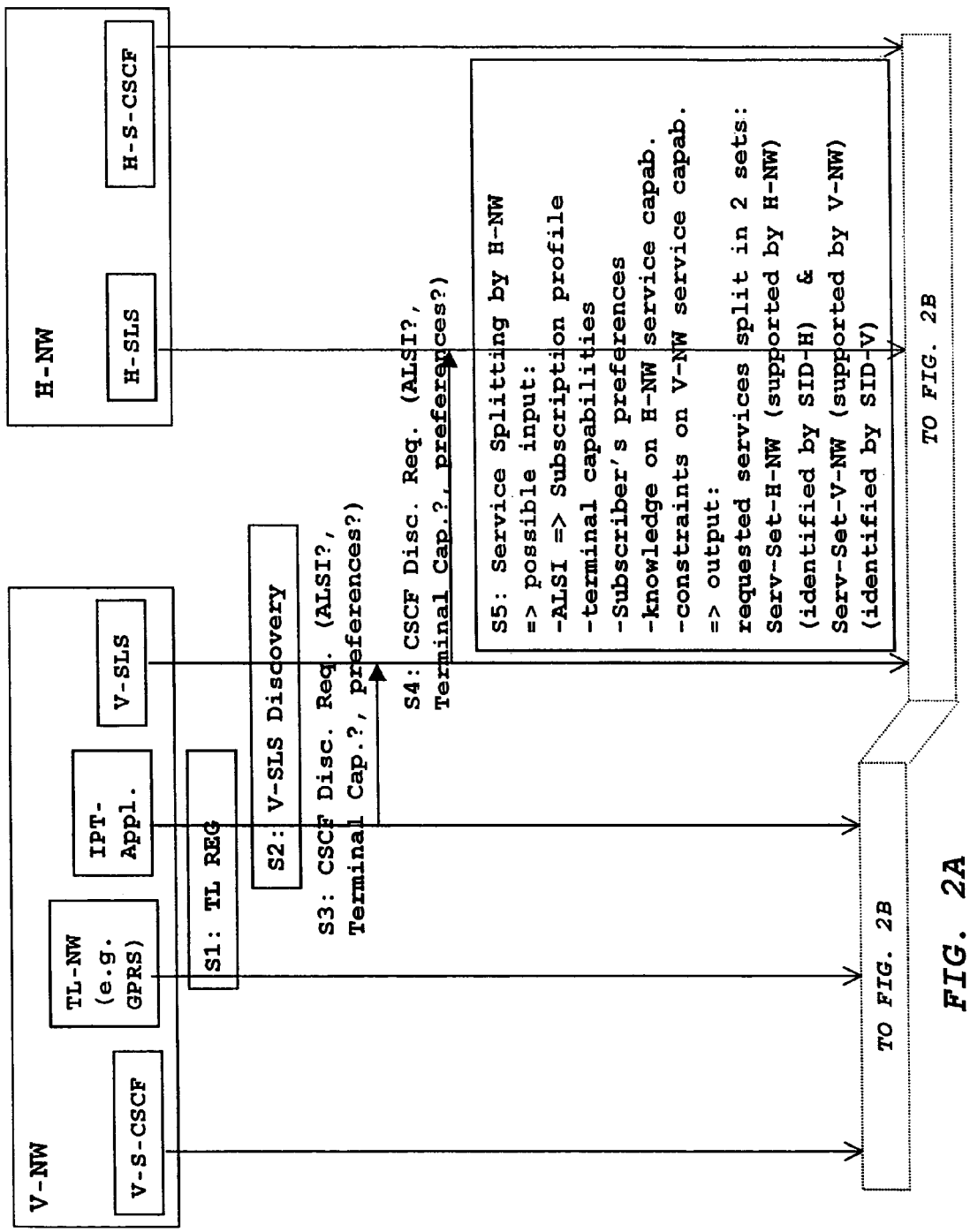
FIG. 2 (composed of FIGS. 2A and 2B) illustrates a signaling diagram of the signaling between network entities involved in the implementation of the present invention.
Figure 2B:
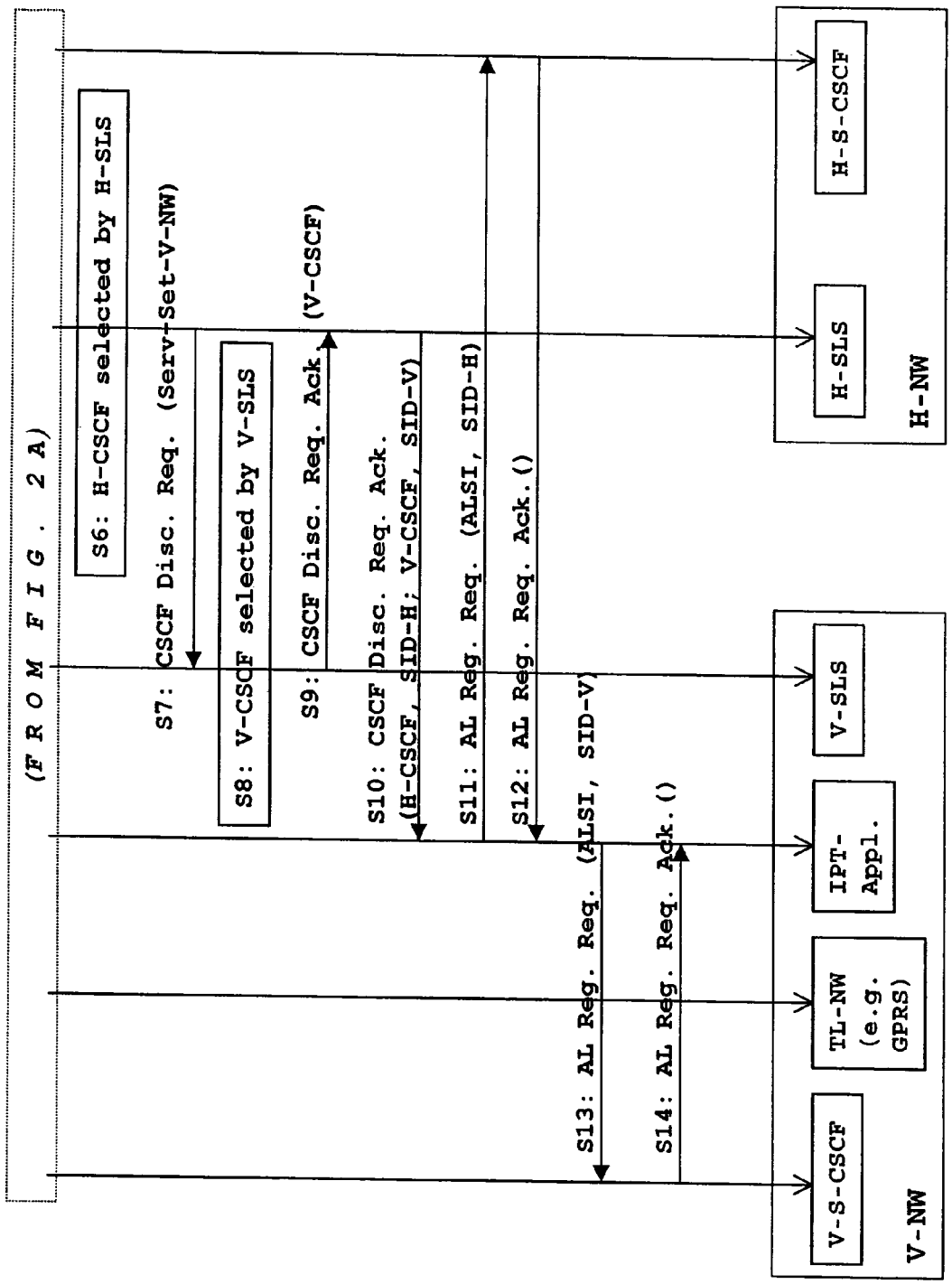

FIG. 2 (consisting of FIG. 2A and FIG. 2B) illustrates a signaling diagram of the signaling between network entities involved in the implementation of the present invention.

In this regard, it should be noted that as the terminal equipment TE has roamed to the visited communication network V-NW, it is no longer actively communicating via the access network H-A-NW. Consequently, FIG. 2 illustrates merely those network entities of the home network H-NW which are still involved in the signaling according to the method for service provisioning to a subscriber terminal TE having roamed from a first communication network H-NW to a second communication network V-NW. In FIG. 2, in the horizontal direction, the signaling messages between network entities are illustrated, while vertically, the sequence of the method steps and corresponding messages over time is represented.

In step S1, "TL REG" (transport level registration), the terminal equipment registers to the (access) network. Such a registration may for example be a normal GPRS attach and a PDP context activation in case the access network is a GPRS access network. At this stage, the subscriber's terminal equipment has an IP address (Internet Protocol address) and is attached to an access network that enables the usage of the internet protocol. This so-called IP-enable access network is denoted by "IPT_Appl." in FIG. 2, and represents an IP telephony application level functional entity of the core network. No additional requirements are needed for GPRS at this time. It should be noted here, that the transport level network (access network) can be GPRS, but also any other access network.

In a subsequent step S2 labeled "V-SLS Discovery", the subscriber to the internet protocol telephony discovers a local database entity V-SLS in the visited network. This discovery is effected in accordance with a SLP DA discovery mechanism using multicast (SLP=Service Location Protocol). Also this discovery does not affect and/or require changes to the GPRS access network, in particular, no changes to the gateway GPRS support node (GGSN) thereof.

Thereafter, in step S3, the IPT Application level functional entity requests a discovery of a communication control entity CSCF towards the database entity of the visited network V-SLS. At this step, the IPT application level functional entity provides the database entity V-SLS with the IPT application level functional entity's ALSI (application level subscriber entity). Optionally, an alias name of the database entity H-SLS of the home network which may be kept in the Subscriber identity module (SIM) of the terminal can in addition be provided to the database entity V-SLS of the visited network. The alias name can be based on the usage of the domain name system (DNS). In this step, the database entity of the visited network V-SLS acts as a directory agent.

Based on the thus provided information, the database entity V-SLS of the visited network finds out, in step S4, the database entity H-SLS of the home network. That is, the H-SLS is discovered on the basis of the ALSI or on the basis of the ALSI in combination with the alias name of the home network's database entity H-SLS, which alias name has been provided by the terminal equipment. The (previous) request for discovery of a communication control entity CSCF is forwarded further to the database entity H-SLS of the home network. Together with the ALSI information, the database entity H-SLS is provided with, for example, information on the terminal equipment capabilities (i.e. whether or not it supports certain services) and/or subscriber preferences (that is which services the subscriber preferably uses). Additional information may be provided if available and/or necessary. Generally, the H-SLS is provided with information on conditions to be evaluated later on for service splitting.

Subsequently, in step S5, at the home network side, more particularly, the database entity H-SLS of the home network takes a decision on the splitting of requested services. Optionally, the decision on service splitting may be taken by the database entity H-SLS together with the terminal equipment, for example, if the splitting decision is dependent on the services supported by the terminal equipment TE. As a result of the decision for splitting requested services, two sets of services are obtained: those provisioned by the home network (H-NW provisioned) and those provisioned by the visited network (V-NW provisioned).

The above mentioned splitting decision is based, for example, on the following conditions: the ALSI (application level subscriber identity) which determines a subscription profile of a respective subscriber; the terminal capabilities, that is the technical features of the terminal necessary to support a respective service; the subscriber's preferences on the usage of certain services; information representing a knowledge on the service capabilities offered by the home network H-NW; constraints/restrictions on the services offered by the visited network V-NW.

As a result of the evaluation of the conditions, the number of services requested by the terminal equipment is split in two sets: a service set supported by the home network Serv-Set-H-NW (identified by an identifier SID-H), and a service set supported by the visited network Serv-Set-V-NW (identified by an identifier SID-V).

In this regard, it should be noted that the splitting may even be effected in such a manner that one set does not contain any service, so that a service set may also be "empty". If so, the presented method assumes a case of previously proposed CSCF discovery scenarios. Stated in other words, if the Serv-Set-V-NW is empty, no services are provided by the communication control entity of the visited network, and the communication control entity CSCF of the home network H-NW is responsible for service provisioning. This case corresponds to the model, according to which the CSCF in the home network is always responsible for service provisioning. If, however, the Serv-Set-H-NW is empty, no services are provided by the communication control entity of the home network, and the communication control entity CSCF of the visited network V-NW is responsible for service provisioning. This case corresponds to the model, according to which the CSCF in the visited network is always responsible for service provisioning. Whereas, in case none of the service sets is empty, a cooperative or mixed model is established, according to which the visited network may provide services specific for the visited network such as local services, and the home network may provide remaining requested services.

In step S6, the database entity H-SLS of the home network selects a communication control entity H-CSCF for the service set Serv-Set-H-NW of services to be provisioned by the home network. At this time, it acts as a directory agent.

Thereafter, in step S7, the database entity H-SLS requires, from the database entity V-SLS, the discovery of a communication control entity (CSCF) in the visited network for the service set Serv-Set-V-NW of services to be provisioned by the visited network.

Then, in step S8, the database entity V-SLS selects a communication control entity V-CSCF for the requested service set.

In step S9, the database entity V-SLS of the visited network returns an information on the selected V-CSCF to the database entity H-SLS of the home network, that is an acknowledgment is submitted to the H-SLS.

Then, in step S10, the database entity H-SLS provides the IPT Application layer entity with information, that is the addresses of the selected communication control entities H-CSCF and/or V-CSCF together with the identifiers for identifying the service sets (SID-H, SID-V) which were obtained as a result of service splitting (see step S5 above).

Finally, in step S11 through step S14, the IPT application level functional entity performs registration to the appropriate/selected communication control entities (CSCF) with the corresponding service identifiers (SID-H, SID-V).

Thus, as has been described herein above, the present invention provides an extension of previously proposed SLS (service lookup server) discovery procedures, such that the method is applicable to the discovery of communication control entities (CSCF) of both networks, the home network as well as the visited network. The method above provides a better sharing of available services for a roaming subscriber, for example, location dependent and/or local services are provided by the visited network, others by the home network.

Additionally, the presented CSCF discovery scheme according to the present invention is based on the service location protocol SLP and service location server SLS with multicast address used. The service location protocol SLP, in an overview, supports a framework by which client applications are modeled as user agents (UA) and services are advertised (offered) by service agents (SA). A third entity named a directory agent (DA) provides salability to the protocol. The user agent issues a service request on behalf of the client application, specifying the characteristics of the service which the client (user) requires. The user agent will receive a service reply specifying the location of all services in the network which satisfy the request. The service location protocol framework allows the user agent to directly issue requests to service agents. In this case, the request is multicast. Service agents receiving a request for a service which they advertise unicast a reply containing the location of the service. In larger networks, one or more directory agents are used. The directory agent functions as a cache. Service agents send register messages containing all the services they advertise to directory agents and receive acknowledgment in reply. These advertisements must be refreshed with the directory agent, otherwise they expire. User agents unicast requests to directory agents instead of service agents if any directory agents are known. User and service agents discover directory agents in two ways. First, they issue a multicast service request for the directory agent service when they start up. Second, the directory agent sends an unsolicited advertisement infrequently, which the user agents and service agents listen for. In either case the agents receive a directory agent advertisement.

According to the present invention and its proposed method, two levels of database entities SLS are used instead of only the database entity of the visited network. Each database entity SLS of a level is responsible for selecting a suitable communication control entity CSCF within its own network. That is, the database entity of the visited network V-SLS is discovered by the roaming subscriber's terminal equipment using SLP. The database entity in the home network H-SLS is subsequently discovered/determined by the database entity of the visited network V-SLS by some analysis or using the alias name of H-SLS provided by the subscriber. At the home network side, a decision is taken concerning the splitting of requested services between the home network and the visited network. The communication control entity H-CSCF of the home network is selected by the database entity of the home network H-SLS. The database entity H-SLS of the home network requests the discovery of the communication control entity V-CSCF in the visited network from the database entity of the visited network V-SLS on behalf of the subscriber, if it is required (if V-CSCF is selected to provide some service(s)).

Accordingly, as has been described herein above, the present invention is a method for service provisioning to a subscriber terminal TE having roamed from a first communication network H-NW to a second communication network V-NW, each of the first and second networks comprises an access network H-A-NW, V-A-NW; TL-NW via which the subscriber terminal TE communicates with an associated core network H-C-NW, V-C-NW, each of the core networks H-C-NW, V-C-NW being provided with at least one communication control entity H-S-CSCF, V-S-CSCF for performing, according to available services, communication control between the respective communication network and the terminal, and a database entity H-SLS, V-SLS keeping a record of available communication control entities in the core network of the communication network, the method comprising the steps of: accessing S1, from said subscriber terminal TE, the core network V-C-NW of the second communication network V-NW, discovering S2–S10 at least one communication control entity among the communication control entities of both core networks, which is capable of controlling the communication with the subscriber terminal TE according to services requested by the subscriber terminal, and registering S11–S14 to at least one of the at least one discovered communication control entity, irrespective of whether it is located in said first or said second communication network.

Although the invention has been described in terms of its preferred embodiments, it should be understood that numerous modifications may be made thereto without departing from the spirit and scope of the invention. It is intended that all such modifications fall within the scope of the appended claims.

The invention claimed is:

1. A method of provisioning service to a subscriber terminal having roamed from a first communication network to a second communication network, comprising:

each of said first and second networks comprising an access network via which said subscriber terminal communicates with an associated core network, each of said core networks being provided with at least one call state control functional entity for performing, according to available services, communication control between the respective communication network and the terminal, and a database entity keeping a record of available communication control entities in said core network of said communication network;

accessing, from the subscriber terminal, the core network of said second communication network;

discovering at least one call state control functional entity among the communication control entities of both core networks, which is configured for controlling the communication with the subscriber terminal according to services requested by the subscriber terminal; and registering to at least one of said at least one discovered call state control functional entity, irrespective of whether the at least one discovered call state control functional entity is located in said first or second communication network, wherein said discovering precedes said registering and follows said accessing;

wherein said discovering further comprises:

partitioning at least some services requested by said subscriber terminal into service subsets, such that each service subset is adapted to services available in a respective one of said first and second communication networks.

2. A method according to claim 1, wherein said discovering further comprises:

accessing, from said subscriber terminal, said database entity of said core network of said second communication network; and accessing, from said database entity of said core network of said second communication network, said database entity of said core network of said first communication network.

3. A method according to claim 1, wherein:

said partitioning is effected by said database entity of said core network of said first communication network.

4. A method according to claim 3, wherein:

said partitioning comprises evaluating a partitioning condition.

5. A method according to claim 4, wherein said partitioning condition to be evaluated consists of at least one of an application level subscriber identity defining the subscriber's subscription profile, a terminal capability defining the services to which the terminal equipment is adapted, a subscribers preference defining preferred services set beforehand by the subscriber, a first-communication-network-service-capability defining the services that is to be provisioned by the first communication network, or a second communication network service restriction defining services that is not to be provisioned by the second communication network.

6. A method according to claim 1, wherein:
said accessing, said discovering, and said registering are performed using messages conforming to the service location protocol.

7. An apparatus for service provisioning to a subscriber terminal having roamed from a first communication network to a second communication network, comprising:
roaming means for roaming from said first network having a first core network to said second network having a second core network;
accessing means for accessing the second core network;
discovering means for discovering, after accessing the second core network, a call state control functional entity among communication control entities of both the first core network and the second core network, wherein the discovered call state control functional entity is configured to control communication with the apparatus according to services requested by the apparatus; and
registering means for registering to the discovered call state control functional entity, without considering the at least one discovered call state control functional entity is located in said first network or said second network
wherein said discovering precedes said registering and follows said accessing;
wherein said discovering further comprises:
partitioning at least some services requested by said subscriber terminal into service subsets, such that each service subset is adapted to services available in a respective one of said first and second communication networks.

8. A system for service provisioning to a subscriber terminal having roamed from a first communication network to a second communication network, comprising:
a user agent configured to roam between said first communication network and said second communication network,
a service agent configured to advertise services for the user agent, and
a directory agent configured to cache service advertisements from the service agent and to receive a request from the user agent,
wherein the user agent is configured to discover the directory agent using a process that is configured to discover the directory agent regardless of which of the two networks is home to the directory agent,
wherein said discovering further comprises:
partitioning at least some services requested by said subscriber terminal into service subsets, such that each service subset is adapted to services available in a respective one of said first and second communication networks.

* * * * *